United States Patent Office 3,476,078
Patented Nov. 4, 1969

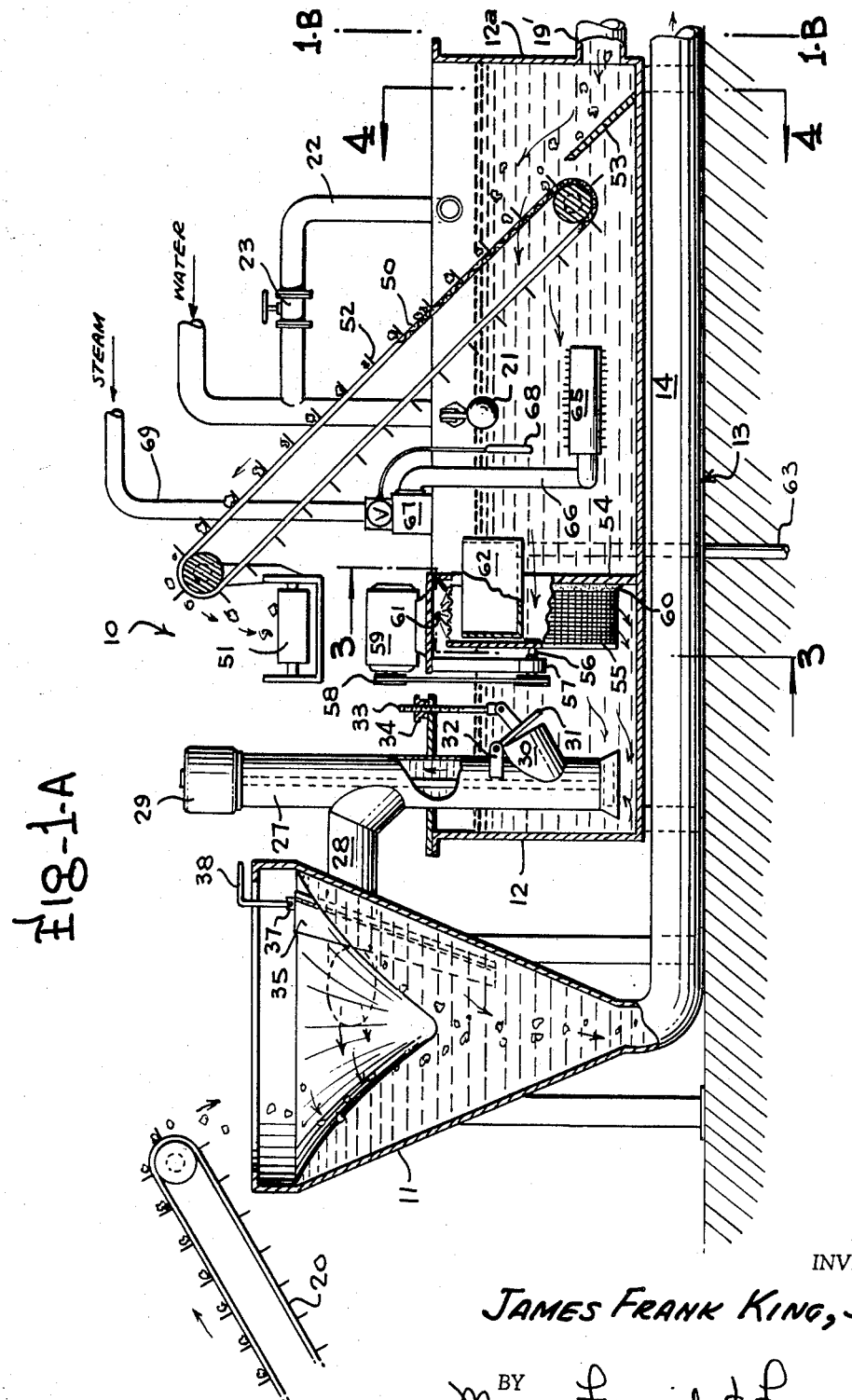

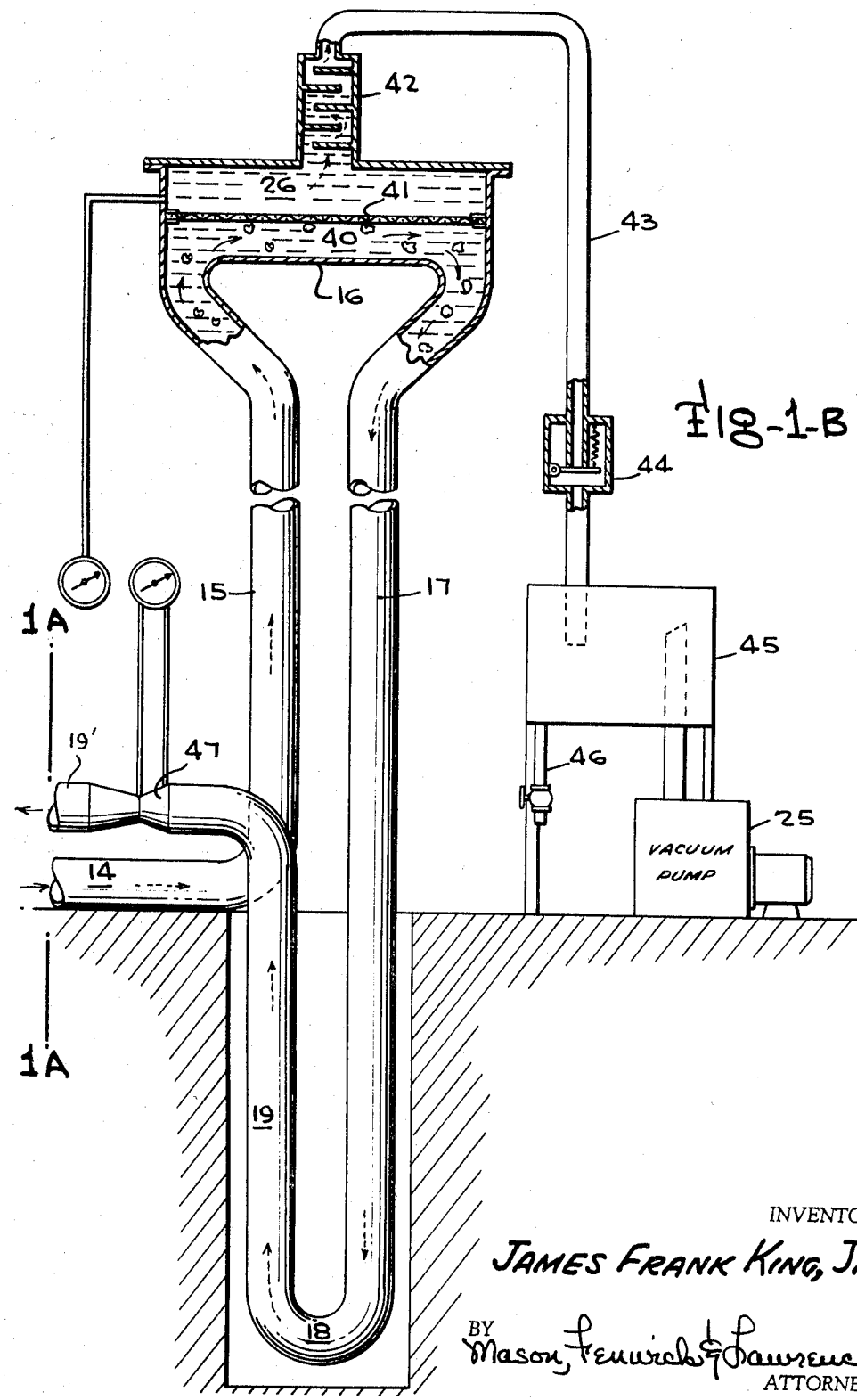

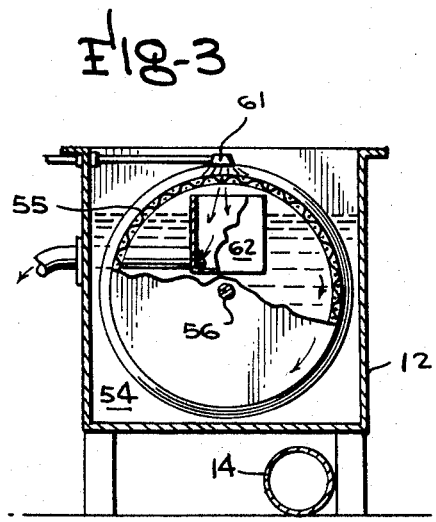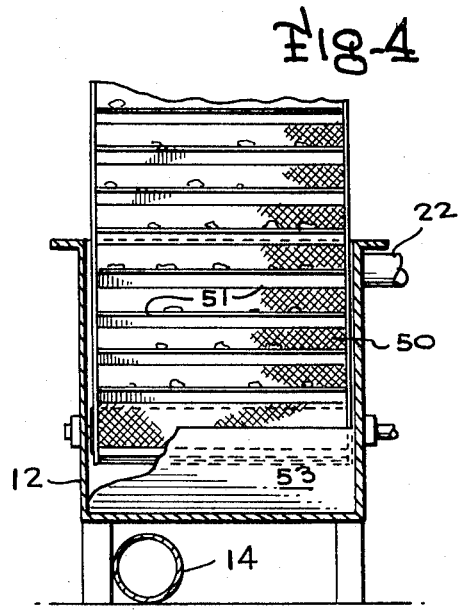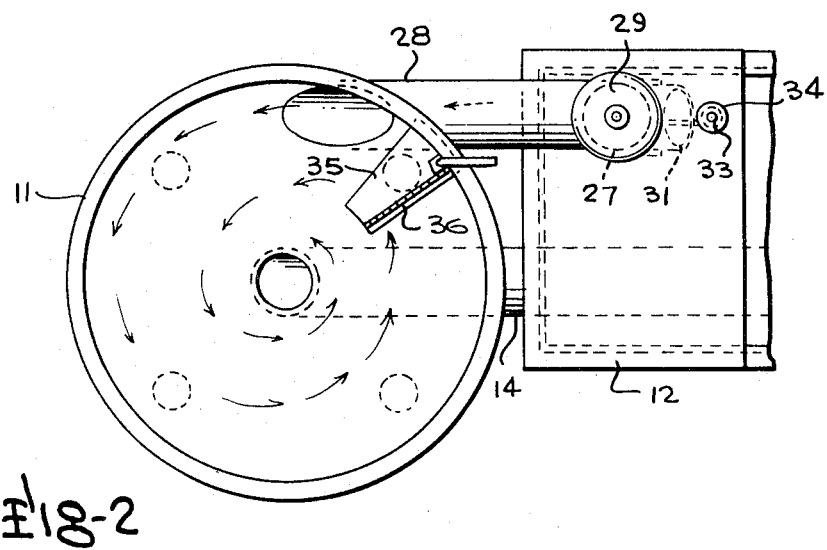

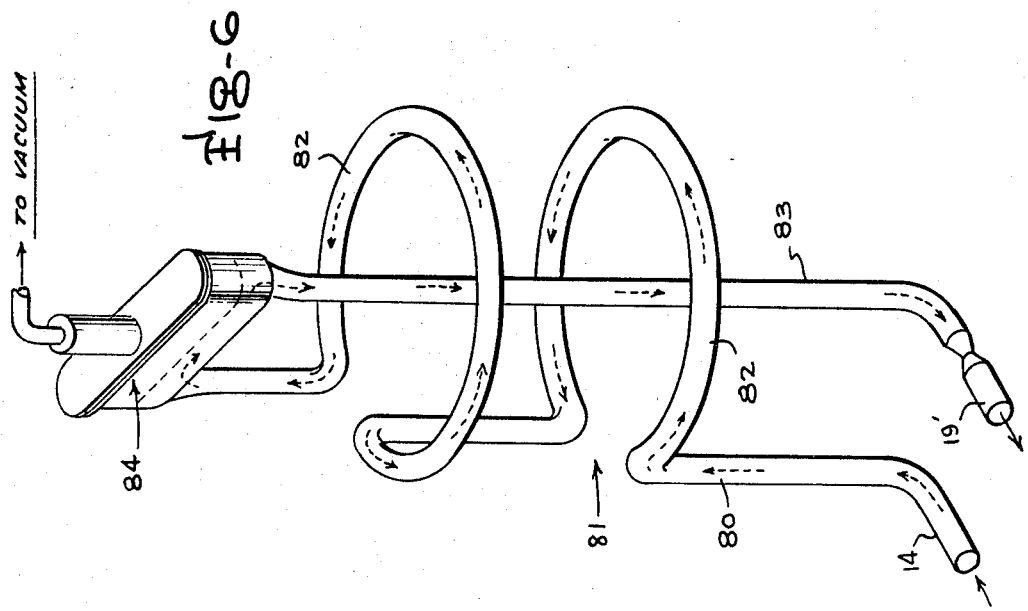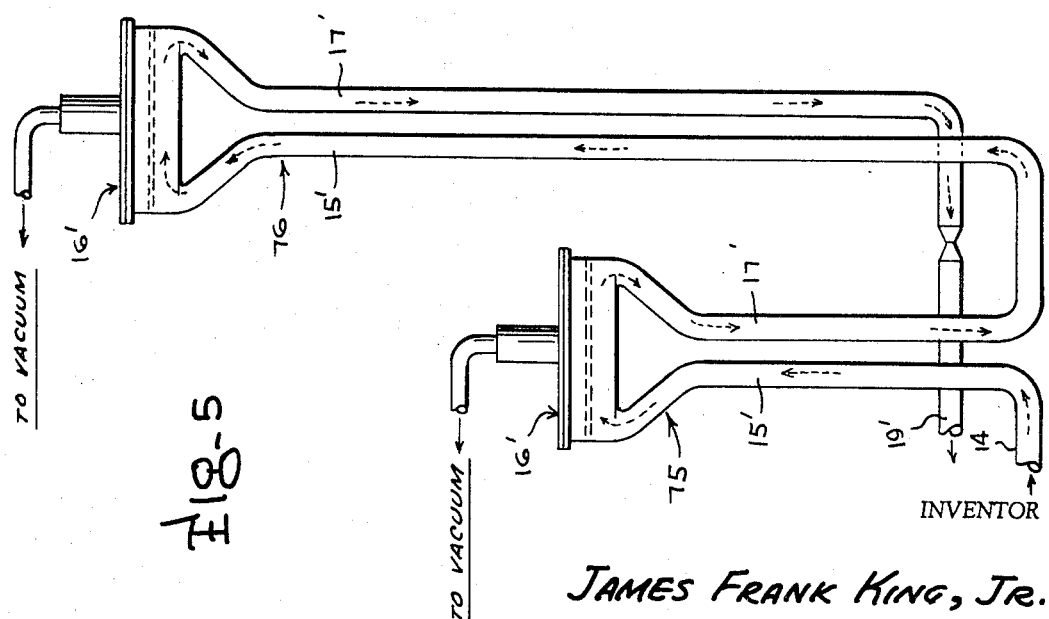

3,476,078
VACUUM IMPREGNATING APPARATUS
James Frank King, Winston-Salem, N.C., assignor to The Bahnson Company, Winston-Salem, N.C., a corporation of North Carolina
Filed July 20, 1966, Ser. No. 566,591
Int. Cl. B05c 3/10, 11/00; A23l 1/00
U.S. Cl. 118—30          9 Claims The present invention relates in general to apparatus for vacuum impregnation of products, particularly food products, and more particularly to apparatus for extracting air from the interior cellular structure of food products while the products are submerged in a liquid and introducing the liquid into the products' spaces formerly occupied by the air as a continuous process by varying the pressure in the region occupied by the product.

Heretofore, it has been recognized that improvement in the quality of certain fruits may be achieved by drawing a vacuum on the fruit to withdraw air from its cellular structure and replacing water or some other liquid in the spaces from which the air is evacuated to improve the qualities of the food product. In the case of dried fruits, for example, it has been recognized that the fruit may be hydrated under vacuum conditions to effect impregnation of water into the structure of the fruit.

New processes for the preparation of fruits for the market are being constantly developed, and have to do, for example, with drying, freezing, freeze-drying, slicing, cooking and the like. Many of these processes, such as freeze-drying require a product that has in its natural state a very special cellular structure, moisture content, and chemical composition.

Many fruits, in their natural state, contain as much as one-quarter of their volume as air entrapped by the cellular structure of the product. In many processes, it becomes desirable to withdraw this entrapped air and replace it by water or suitable liquid solution. A typical example of such a product is an apple, whose properties for subsequent freezing could be improved by injecting a solution which could be twenty-five percent corn syrup dissolved in water into the cells of the product without rupturing the cell. This type of impregnation would add additional sweetening to the product, as well as preparing it for subsequent freezing, since an increase in the sugar content in the fluid of the cell would cause the formation of a smaller ice crystal when the fluid of the cell is frozen by subsequent conventional freezing means. As the ice crystal size is reduced, the tendency to rupture the product cell is also reduced so that a better frozen product results. In addition, color preservatives such as various sulfites could be injected into the cells of the product to maintain a natural color of the product as the product undergoes additional operations such as slicing. It would also be possible to fortify the liquid in the cellular structure of the products by the addition of a high concentration of vitamin C in sugar solution, and cellular structure of some products could be made more firm by the injection of calcium compounds.

Heretofore, efforts to effect vacuum impregnation of such food products have largely taken the form of batch processes, wherein a large quantity of the product is placed in a pressure vessel, submerged in a quantity of liquid to be impregnated in the product, after which a vacuum is drawn on the vessel, the fluid impregnation medium and the product which is maintained for a selected period of time. During the vacuumizing process, air entrapped in the cellular structure of the product is withdrawn through the cell wall with no apparent damage to the cell and the entire product is placed in a condition of high vacuum within its cellular structure. The vacuum in the pressure vessel is then broken and the submerged product absorbs a quantity of the impregnation medium to allow its cells to come back to atmospheric pressure.

It will be apparent that such a batch process of vacuum impregnation involves considerable delays in the processing line, as the batch of product must stand for a period of time in the vacuum vessel to effect the impregnation process. These delays reduce the amount of product that can be processed in a given period of time.

An object of the present invention, therefore, is the provision of a novel apparatus for effecting vacuum impregnation of food products to withdraw air entrapped in the cellular structure of the product and impregnate liquid therein in a continuous process.

Another object of the present invention is the provision of novel apparatus for effecting vacuum impregnation of food products with a liquid in which the food products are submerged as a continuous process by flowing the product through the impregnation apparatus.

Another object of the present invention is the provision of novel apparatus for vacuum impregnation of food products, wherein a single tank and a small associated inlet hopper are provided for the liquid which is to be impregnated into the products.

Another object of the present invention is the provision of novel apparatus for vacuum impregnation of food products as a continuous process, wherein an input hopper for the food product is provided with means producing a forced vortex therein to facilitate feed of the food products into the fluid system of the apparatus.

Another object of the present invention is the provision of a novel vacuum impregnation apparatus for food products having an operating tank and an associated inlet hopper for the liquid and fluid conduits connecting thereto in a manner providing a rising vacuum leg and a descending pressure leg through which the product is conveyed by entrainment of the products in the fluid flow path through these conduits to successively extract air from the products and impregnate the same with the surrounding liquid in which they are submerged.

Another object of the present invention is the provision of a novel vacuum impregnation apparatus wherein a transfer section connecting a rising fluid leg and a descending fluid leg includes plenums separated by a permeable screen to facilitate withdrawal of air bubbles from the system.

Other objects, advantages and capabilities of the present invention will become apparent from the following detailed description, taken in conjunction with the accompanying drawings illustrating a preferred embodiment of the invention.

In the drawings:

FIGURES 1a and 1b constitute a composite diagrammatic elevation view of the vacuum impregnation apparatus of the present invention, with some parts broken away and some parts shown in section to illustrate the construction thereof;

FIGURE 2 is a fragmentary top plan view of portions of the apparatus occurring in the left hand portion of FIGURE 1a showing particularly the construction of the input hopper;

FIGURE 3 is a vertical transverse section view, taken along the line 3—3 of the FIGURE 1a, illustrating details of construction of the automatic strainer disposed within the operating liquid tank;

FIGURE 4 is a vertical transverse section view taken along the line 4—4 of FIGURE 1a; and FIGURES 5 and 6 are somewhat diagrammatic, fragmentary elevation and perspective views, respectively, of modified forms of the vertical transition portion of the conduit system.

Referring to the drawings illustrating a preferred embodiment of the invention as a specific exemplification of the method and apparatus, like reference characters designating corresponding parts throughout the several figures, the apparatus indicated generally by the reference character 10 includes an input hopper 11 and a tank 12, hereinafter usually referred to as the operating tank 12. A system of piping, indicated generally by the reference character 13, formed for example of pipes which may be about six or eight inches in diameter, connects the bottom outlet of the inlet hopper 11 with the operating tank 12. The piping system 13 includes a generally horizontally extending leg 14 connected at one end to the bottom outlet opening of the hopper 11 and extends beneath the operating tank 12, which may be spaced above the floor level a suitable distance, to a point located beyond the wall 12a of the operating tank 12 remote from the hopper 11, where it curves upwardly to define a vertical pipeline 15 forming an ascending leg, extending for a suitable distance, for example about twenty-seven feet above the level of the operating tank 12 to a transfer chamber 16. A descending vertical pipe leg 17 forms a continuation of the piping system extending from the transfer chamber 16 to a position located somewhat below the level of the operating tank 12 and recurves as indicated at 18 to define a shorter ascending leg 19 extending to the lower portion of the operating tank 12 and joining the operating tank at the tank wall 12a.

Before the raw product to be processed by the vacuum impregnation apparatus is admitted to the inlet hopper 11, for example by delivery thereto on a conveyor belt 20, a predetermined liquid level must be established in the hopper 11. As one means of establishing this liquid level, when the system is in the process of being started and with no vacuum applied, the liquid level in the operating tank 12 is brought up to a full condition by use of a float valve 21 and a quick-fill line 22 which is controlled by a manual valve 23. A liquid pump, herein indicated by the reference character 27 is housed in a vertically elongated pipe located in the region of the tank 12 near the hopper 11, having an inlet opening near the bottom of the tank 12 and having a lateral branch conduit 28 connecting the same with an inlet opening in the side of the hopper 11 extending in tangential relation to the latter. The pump 27 is driven by the electric motor 29 and provides means for transferring liquid from the tank 12 to the hopper 11. During filling of the tank 12, the operator activates the motor of pump 27 to transfer liquid to the hopper 11 to at least a level comparable to that in tank 12, the pipe lines 15 and 17 being concurrently filled to a similar level. Vacuum is then applied to the system by a vacuum pump 25 which begins to evacuate space 26 in the transfer chamber 16 through appropriate piping to be later described, drawing liquid upward through pipes 15 and 17 to an elevation above the atmospheric pressure level in tank 12 which is determined by the suction capacity of the pump 25. The motor 29 is jogged by the operator to maintain a reasonably full hopper 11 during the time that increasing vacuum in the system is removing liquid from the hopper. Assuming that the vacuum pump 25 has the capacity to elevate liquid in the pipes 15 and 17 until a merging of the two liquid columns is effected within the space defined by the transfer chamber 16 at the top of the vacuum legs 15, 17 liquid will begin to flow through the entire system as soon as a hydraulic gradient is established between the liquid in tank 12 and the liquid in hopper 11. This hydraulic gradient is provided by the operation of pump 27, which is maintained in continuous operation after full vacuum has been established.

For all practical, operating purposes, the resistance to liquid flow throughout the entire circuit is a constant; therefore, any predetermined flow rate of liquid through the system will require that a particular hydrostatic head be established as the driving force. Since the head pressure liquid in hopper 11 is supplied by pump 27, the liquid level in hopper 11 will continue to rise above the liquid level in operating tank 12 until sufficient head is developed to force the liquid through the entire circuit in the proper volume or else overflow hopper 11. The capacity of the pump 27 is chosen to establish a selected differential liquid height between hopper 11 and tank 12 without overflowing hopper 11, which differential liquid height determines the liquid flow through the system.

Pump 27 receives its liquid from the lower extremity of operating tank 12 and the impeller type pump within the tubular body of assembly 27 lifts the liquid from the tank at least far enough to discharge it from conduit 28 and into the extremity of hopper 11. By-pass discharge connection 30 extends through the side of the pump casing near but on the discharge side of the pump impeller so that recirculated liquid can be returned to the tank 12 and then to the pump inlet through its open end.

Valve 31 is pivotally supported by struts 32 on the pump body so that it can either close off the opening of recirculation pipe 30 or it can be swung out of the way to allow virtually the entire pump discharge to issue back into tank 12 instead of being lifted still further to the discharge point of conduit 28. Valve 31 is lifted and retained by control rod 33 which extends to an accessible point outside of tank 12 and onto which adjustment knob 34 is threaded. Adjustment knob 34 is also calibrated so that any adjustment within the range of valve 31 can be repeated even though changes are being made in the system. Adjustment of this valve 31 therefore would change the liquid elevation in hopper 11 and consequently the mass flow through the entire system.

The liquid issuing from conduit 28 is conducted into inlet hopper 11 at a point high along the hopper sidewall and tangent to the sidewall surfaces. This construction causes a forced vortex to exist in the liquid of the hopper 11. This provides some significant advantages. It will be understood that virtually all products which go into the vacuum impregnating apparatus include a quantity of air and have a specific gravity somewhat less than that of the liquid. Since these particles have buoyancy, they will float in a liquid reservoir until they find themselves in a descending velocity zone great enough to overcome their flotation. In a hopper of fairly generous dimensions, this critical velocity is not reached until the product is brought downward through the liquid close to the discharge opening. This should be obvious since the velocity through the system is only required to be fast enough to transport the product through positively and it is desirable for the flow to be as slow as possible for the most efficient impregnation. Due to the increase in cross-sectional area of inlet hopper 11, it can be seen that the downward velocity of the liquid varies inversely proportionally to the cross-sectional area and the area increases very rapdly because of the aspect ratio of the hopper which is a truncated cone. If the hopper is so small that the downward velocity is sufficient to carry the product, its storage capacity and therefore resistance to overflow due to slight surge is negligible and it is also very difficult to convey the product properly into the hopper. The forced vortex is used to drop the operational surface of the liquid in a larger hopper to a point close to the high velocity, critical region.

Also, an inherent property of a whirlpool type vortex is that an object trapped in the pool will try to escape the vortex by moving to the center line of rotation. This action picks up the product no matter where it is dumped in the inlet hopper 11 and quickly accumulates the particles in the center of the vortex from which they can move smoothly down into the pipe 14 without contact with the sidewalls. These functions related to the forced vortex provide a hopper that will accept product very readily, accumulate the product in a manner that presents it to the pipe 14 smoothly and does not give a critical liquid elevation in hopper 11 above which the product will float and eventually choke off the entire system.

Since the rotational velocity of the liquid in hopper 11 is dependent upon the construction of the hopper as well as the input volume and location of liquid from pump 27, it is unlikely that a vortex could be formed which would satisfy all operating conditions of flow. Therefore, a vortex breaker 35 is connected to the side of the conical hopper 11 by means of hinge 36 so that it will have a tendency, when opened away from the hopper surface, to break up the smooth vortex flow and thereby decrease its velocity. Universal joint 37 connects operating handle 38 to the breaker plate 35 so that control and positioning of the plate may be accomplished from outside hopper 11.

It is believed that under some flow conditions, the swirl of velocity may either not be great enough to establish the forced vortex with its core close enough to the high velocity region to cause the product to move smoothly into the pipe 14 or the rotational velocity may be so great that the follow cone of the vortex may extend down into the pipe 14 which would convey unwanted air into the system. This breaker plate 35 will allow adjustment of a predetermined depth of the hollow cone under any set flow condition.

After the product has moved smoothly down through hopper 11 and into the entrance to pipe 14 it is then conducted smoothly through the pipe 14 at the flow velocity until it starts moving up the vertical portion 15 of the pipe system toward its maximum elevation. During the upward travel of the product in pipe 15, the product is continually moving through zones of decreased pressure until finally at a preset height (corresponding to a predetermined vacuum) the product is transferred into a short, horizontal transfer chamber 16. This chamber 16 consists of plenums 26 and 40 which are separated from each other by separation screen 41. At the entrance to this separation zone, cellular air has been drawn from the product and it is entrained in the liquid in the form of air bubbles of various sizes. As the product and air bubbles are moved across underneath separation screen 41 due to the flow of liquid through the system, the air bubbles, by virtue of their buoyancy, reach the vertical level of the separation screen and move therethrough although the product, being larger, cannot escape through the screen and follow the liquid flow toward and into the descending pipe line 17. After the evacuated air bubbles have moved through screen 41, they float upward through the liquid in zone 26 of the transfer chamber and eventually find their way into the baffled exit chamber 42.

This baffle chamber 42 may be approximately six feet long on an operating unit and has a multitude of closely spaced baffles, as shown, to partially break down foam formation and to nullify effects of surging within the system so that a minimum amount of liquid will be transferred over into the vacuum line extending downward along the column to the vacuum pump 25. This chamber is nothing more than a dewatering system that centrifuges most of the entrained droplets of water from the air being carried away by the vacuum pump. Vacuum line 43 extends downward from the separation zone and dewatering baffle chamber toward vacuum pump 25 and a check valve 44, installed in this line preferably as near the dewatering chamber 42 as possible. The exhaust air being handled by vacuum line 43 then moves into a vacuum receiver 45 which is not completely essential but is considered good practice on a system. Not only does this receiver 45 contain a large volume of air under the maximum vacuum developed by pump 25 so that it tends to counteract surging in the system, but also it acts as a velocity reducer which tends to eliminate any condensate which has been picked up in vacuum line 43 so that the vacuum pump will not have to handle this liquid material. Such a chamber type separator is valuable to the system since, invariably, small particles of the product along with seeds and other contaminants find their way into the vacuum line and should be separated before the level of the vacuum pump is reached. These contaminants can be periodically drained away through drain valve 46.

The check valve 44 readily permits flow of air from the transfer chamber 16 toward the pump 25 as the pump operates to extract air from the chamber 16, but closes immediately if the water columns in pipes 15 and 17 tend to surge to a lower level to prevent reverse flow of air into the chamber 16. This aids in minimizing surge conditions as it isolates the pump 25 from the chamber 16 if the liquid level tries to decrease, immediately installing a very high vacuum above the liquid columns which resists lowering of the liquid level.

After the evacuated product moves away from the transfer and air separation chamber 16 it then enters the descending leg of the vacuum system which is shown as pipeline 17. During the product's travel down this leg it experiences an increase in liquid pressure until, approximately half way down, atmospheric pressure is again reached. If desired, a pressure leg may be included which extends some number of feet into a conventional well bored into the ground, as indicated by the lower portion of pipe 17 and the pipe 19. This practice not only increases the total time of submergence of the product under the impregnation liquid but it also immediately subjects the product to a hydraulic pressure of approximately ten pounds per square inch which, when rather viscous solutions such as sucrose solutions are used, helps to force solution into the cell voids which have resulted from the vacuum process. Although the pressure leg part of the system is not completely necessary for the proper functioning of the device, this burst of pressure on the liquid trying to reach the innermost cells of the product does speed up the overall operation and allows a reduction in total circuit length. At the lowermost point of the pressure leg the product is again turned at bend 18, along with the liquid stream, through approximately 180 degrees and the flow is directed toward ground level by a conduit 19. Just before the fluid in which the product is submerged reaches operating tank 12, the entire mass is transferred through a venturi meter 47 so that fluid flow can be directly read at this point. The flow then moves into the interior of operating tank 12.

Conveyor belt 50, which is used to convey the impregnated product out of the operating tank 12 and onto a secondary conveyor belt 51, is arranged with cleats 52 which cause the product to be lifted onto the conveyor belt without slippage. Since these cleats 52 extend some distance from the surface of conveyor belt 50, it is impossible to seal the lower portion of the belt to the bottom of the operating tank 12 so that product cannot get underneath this belt and move to the left-hand side of the tank as shown. Conveyor belt 50 is wide enough to completely fill the width of tank 12 so that product cannot escape around the side of the belt and this lower part would then be the only escape of the product past the belt. The belt is of woven stainless steel construction, so that it acts as a sieve to remove the product from the liquid passing through. To keep the product away from the open lower section of this conveyor belt to the bottom of the tank, baffle 53 is permanently installed in the tank bottom. After the liquid in the impregnation system passes through conveyor belt 50, and is stripped of its product, it then passes down the tank toward partition 54. This partition completely seals across the tank cross-section and separates tank 12 into two individual compartments. This partition has a circular opening at its center line and into this opening is installed screen drum 55 that has an open end extending through partition 54 toward the incoming fluid and a solid, closed end downstream. The drum is located on shaft 56 which is journalled in bearing 57 and which is rotated slowly by drive assembly 58, which, in turn, is motivated by gear motor 59. The open end of the drum which extends through and is journalled in partition 54 is also sealed to partition 54 by flexible seal 60. Cleaning nozzle 61 sprays high velocity, clear water onto the outside and through the separation screen of drum 55 so that small contaminants which have been trapped by this screen will be washed from the interior surface of the screen as the screen is rotated past fixed nozzle 61. Waste tank 62 is generally rectangular with an open top and is located underneath the spray issuing from nozzle 61 so that the contaminants that are blown from the interior surface of screen 55 will fall into receptacle 62 instead of back into the liquid being cleaned. These contaminants, along with the water that washed them free of the screen, then find their way out of drain 63. The cleaned water then moves from the outside surface of the screen on drum 55 and into the entrance of pump 27 to complete the cycle. Self-cleaning screen 55 is desirable in a system such as this since the impregnation liquid in such a system is not replaced every day and it will finally become so contaminated with small product particles, product seeds and the like as to be too viscous to flow. The high-speed impeller in pump 27 has a tendency to reduce these small, entrained particles to pulp and, in case of apple processing, the entire liquid in the system would resemble apple sauce in a short time.

It will be understood that a slight cooking or blanching of the product may be desirable in many processing applications. Blanching has a tendency to kill the active enzymes in the product which cause the product to take on undesirable properties as a food in a short time after picking. If blanching is part of the operation in a system such as that herein described, chemical preservatives can be tremendously reduced in the concentrated liquid and a better quality product results. For this liquid heating purpose, steam injector 65 is associated with the tank 12, which receives its steam through line 66 from automatic control valve 67. Valve 67 is modulated by temperature sensitive bulb 68. The steam supply for the system is conducted to valve 67 through steam line 69.

A specific example of an impregnation system involving the apparatus previously described may contain approximately 600 gallons of liquid which would be caused to flow through the system at a pipeline rate of approximately 50 feet per minute. This would allow the product to remain submerged in the liquid slightly less than two minutes. Pump 27 may be driven by a three horsepower motor and be capable of elevating approximately 400 gallons of liquid per minute to four feet. A vacuum pump 25 is chosen which is capable of sustaining a vacuum of approximately 27 feet above the atmospheric pressure, liquid level of operating tank 12. This means that the liquid will rise to the vacuum sustained, artificial level of chamber 16 which give several feet of liquid above the separation screen 41 for purposes of operational safety since it is a well recognized fact that the liquid flow will stop if the liquid surface level drops below the lower surface of chamber 16. A system such as this which uses 6 inch diameter round pipe throughout for its conduits is capable of impregnating at least 6,000 pounds of sliced apples or comparable product per hour. The pressure leg of the system would normally be extended to a depth which would subject the product to approximately 10 pounds per square inch hydrostatic pressure at the transfer point.

It will be apparent that the previously described vacuum impregnation apparatus is also particularly well suited for injecting various chemicals into the food product as it passes through a vacuum impregnator. In this connection, it should be borne in mind that the food processor has several distinctly different problems, with which he is faced in the art of preserving; first, some products are used in such a way that the processor makes every attempt to prepare the product so that it will be a completely natural product at the point of consumption, even though it may have been in storage for a long period of time. Second, the food processor might attempt to change the product considerably for a specific end result. A good example, of the latter, is a candied peach or a cucumber pickle. In both of these cases, it is always necessary to allow some chemical to completely impregnate the product, and this is generally accomplished by soaking of the product in the chemical for a reasonably long period of time. In this way, the chemical agent which is to be added to the cellular structure of the product is transmitted by osmosis to the internal cells after an appropriate length of time. In some cases, it is appropriate to treat the product in a special way to simply allow it to undergo the remaining processes before it can be put into storage for shipment to the consumer. Considering the use of the herein described vacuum impregnating apparatus in the preparation of raw fruits, for example raw apples, as they are prepared for an institutional market, the apples, after they are delivered to the processor are culled, graded, and then washed to remove dirt, trash and insecticides. The selected apples are then cored, peeled, and sliced as a part of their initial preparation. In some cases in the past, the coring, peeling and slicing operations have been performed under water to keep the apple flesh from oxidizing. The water underneath which these various operations are sometimes performed might also include a quantity of ascorbic acid which further tends to delay the oxidation process. If the apples are to be passed through the vacuum impregnator herein described, it is likely that these initial operations would be carried out with as much haste as possible so that they can be accomplished in air with the product being quickly conveyed to the liquid receiving hopper 11 of the vacuum impregnator. Since almost all chemicals which may be impregnated into the apple flesh are soluble in water, the liquid in the impregnating machine may have a large group of additives with each chemical addition serving a particular purpose in the preparation of the product. For instance, corn syrup or a sucrose solution may be added to the liquid to a maximum of about 25% by weight to sweeten the product. This also serves to reduce cell rupture because of the smaller size crystals which would be formed if the product is to be subsequently frozen. The liquid may also be fortified with sodium bysulfite, sodium sulfite, pyrophosphoric acid or ascorbic acid to help preserve both the flavor and the taste of the product. Also vitamin C or other vitamin solution may be introduced into the liquid. The liquid of the tank may also have as an additive any type of special flavoring which is either not normal to the natural product or not in sufficient amount in the natural product. For instance, a very bland food product may be improved in flavor by the addition of small amounts of citric acid. It is also known and accepted to make a concentrated extract by the distillation of various peelings such as orange or apple peelings and add this back into the injection liquid to improve both the aroma and the flavor of the final product. Assuming that blanching is not part of the vacuum impregnation process, the food product, such as apples, after passing through the piping system 13 and reaching the tank 12, is removed from the tank by the conveyors 50 and 51 and is allowed to drain during transit down a fairly long conveyor with, in some cases, a strong blast of air directed from above to help remove the residual solution. The product is then packaged in a suitable container such as a metal can or a plastic bag after which it is quickly moved into a commercial blast freezer which quick-freezes the product to retain, as nearly as possible, all of the desired food characteristics. The product is then moved to a holding freezer which can be of any conventional design and is thereafter maintained in a frozen condition until it is thawed by the ultimate consumer.

In regard to blanching of the food product, it will be appreciated that normal blanching of products such as apples would normally be done by submerging the product in water heated to a temperature between 167° and 180° for about two minutes. Since, in the present vacuum impregnator apparatus a flow of heated liquid in this system at a vacuum elevation of 27 feet must be sustained if blanching is to be achieved, reference to a saturated liquid table for temperatures versus saturation pressure would quickly show that these blanching temperatures would be impossible to reach since liquid in the vacuum columns in the region of the legs 15 and 17 would flash into steam and immediately cool itself to the saturation temperature by evaporation. Therefore, in a typical system involving the present impregnation apparatus, the liquid temperature should be controlled at approximately 135° F., which would give a slight factor of safety against undue vaporization of the pure water in the solution. Because of the fact that blanching and impregnation take place simultaneously in the present system, satisfactory blanching results are achieveed in this system at this low operating temperature even though this temperature would be unsatisfactory in conventional, atmospheric vessels. Whereas, in the conventional system, the air entrained in the product serves as an insulating barrier and the interior of the product does not get up to the blanch water temperature, the vacuum impregnation apparatus of the present invention permits the lower temperature blanch liquid to be impregnated rapidly into the innermost cell of the product to attain results otherwise achieved at very much higher blanching temperatures in conventional system.

When particularly delicate or hard to evacuate products are to be processed, it may be desirable to more gradually bring the product to the desired ultimate vacuum pressure level or to subject the products to successive stages of progressively higher vacuum, to reduce the shock on the product or extend the time for evacuation. The vertical conduit transition portion of the previously described apparatus, defined by the vertical legs 15 and 17 and the transfer chamber 16 can be readily modified to attain this, as for example in the manner illustrated in FIGURES 5 and 6, illustrating only the modified portions of the conduct system between the horizontal conduit leg 14 and the outlet end portion 19' of the conduit system adjoining the tank 12.

Referring to FIGURE 5, two or more vertical conduit transitions 75, 76 may be provided between the inlet hopper 11 and tank 12, each comprising an ascending vertical leg 15' and a descending vertical leg 17' interconnected at their upper ends by a transfer chamber 16'. The successive vertical transitions 75, 76 proceeding from the hopper 11 to tank 12 may be of progressively increasing height and each succeeding transfer chamber 16' of the transitions 75, 76 may be at a progressively higher vacuum, so that a particularly delicate product may be impregnated with effectively less shock than would be experienced in going to the ultimate vacuum in one immediate step. Alternatively, the transitions 75, 76 may be of the same height and their transfer chambers 16' may be maintained at the same vacuum, the product being subjected to multiple vacuum phases with an effective rest period at atmospheric pressure between successive vacuum phases.

Another variation is illustrated in FIGURE 6, wherein at least one rest or dwell period is provided during the ascent of the product to the transfer chamber. In this case, the ascending leg 80 of the vertical conduit transition 81 is interrupted by at least one horizontal diversion 82, which is conveniently arranged in the form of a circular run around the descending leg 83 and the support tower or structure for the transfer chamber 84. For example, such a circular horizontal transition 82 may be provided at each ten foot segment of the ascending leg 80 and define about a twenty foot circular path, so that the product rises through a diminishing pressure gradient of about ten feet and is then diverted through a horizontal run of about twenty feet, after which the product rises through another ten feet and undergoes another twenty foot horizontal run, and then ascends the remaining distance to the transfer chamber 84. The circular configuration of the horizontal transition 82 substantially concentric with the descending leg 83 provides a very compact organization of conduits which can be accommodated in restricted space.

What is claimed is:

1. Vacuum impregnation apparatus operable on a continuous basis for evacuating gases from the interior of food products and substituting a liquid in place of the evacuated gas, comprising a product input hopper having an outlet opening, a receiving tank, said hopper and tank adapted to contain said liquid to selected liquid levels therein, a tubular conduit system communicating with said hopper and said tank below said liquid levels for fluid current conveyance of the food products from said hopper to said tank, said conduit system including a vertical ascending conduit leg, a vertical descending conduit leg, a transfer chamber interconnecting the uppermost ends of said legs at a substantial height above the levels of said hopper and tank, conduit means connecting lower end portions of said ascending and descending legs to said outlet opening and said tank, respectively, means for applying vacuum conditions to said transfer chamber to draw said liquid from said tank and hopper into said transfer chamber providing a submerged product transfer path of marked sub-atmospheric pressure in said chamber between said vertical legs, said input hopper being of substantially upwardly opening funnel-shaped configuration with said outlet opening at the bottom thereof, means for supplying the liquid to said hopper in a manner establishing a forced vortex therein for lowering the operating surface of the liquid near the vertical center axis of the hopper to a level sufficiently near the outlet opening to insure fluid current entrainment of the product into said conduit system for passage through said vertical legs and into said tank, said input hopper including adjustable baffle means therein to be disposed at selected positions in said hopper for selectively breaking up the vortex established therein to the appropriate extent to locate the core of the liquid surface at the vertical center axis of the hopper a desired distance from said outlet opening, and means for returning the liquid at a selected rate directly from the tank to said hopper.

2. Vacuum impregnation apparatus as defined in claim 1, wherein said hopper is located on an opposite side of said tank from said vertical legs, and said means connecting the lower end portion of said ascending leg with said hopper outlet opening comprises a horizontal conduit of greater length than said tank extending beneath said tank from the hopper to the ascending leg.

3. Vacuum impregnation apparatus as defined in claim 1, wherein said conduit means connecting the lower end portion of said descending leg to said tank comprises a U-shaped conduit portion extending a substantial distance below the liquid levels of said tank and hopper to subject the food product to marked superatmospheric pressure, said U-shaped conduit portion having a first leg axially aligned with said vertical descending conduit leg as an extension thereof and a second leg having its axis in substantial lateral alignment with the axis of said vertical ascending conduit leg.

4. Vacuum impregnation apparatus as defined in claim 1, wherein said means for applying vacuum conditions to said transfer chamber include a vacuum pump, and a vacuum conduit system connecting said pump with said chamber including a surge tank having a large volume capacity for minimizing surging in the system and a dewatering baffle chamber between the surge tank and transfer chamber having plural closely spaced baffles arranged to define a tortuous path therethrough to break down foam formation and reduce surging.

5. Vacuum impregnation apparatus operable on a continuous basis for evacuating gases from the interior of food products and substituting a liquid in place of the evacuated gas, comprising a product input hopper having an outlet opening, a receiving tank at substantially the same level as said hopper, said hopper and tank adapted to contain said liquid to selected liquid levels therein, a tubular conduit system communicating with said hopper and said tank below said liquid levels for fluid current conveyance of the food products from said hopper to said tank, said conduit system including a vertical ascending conduit leg, a vertical descending conduit leg, a transfer chamber interconnecting the uppermost ends of said legs at a substantial height above the levels of said hopper and tank, and conduit means connecting lower end portions of said ascending and descending legs to said outlet opening and said tank, respectively, means for applying vacuum conditions to said transfer chamber to draw said liquid from said tank and hopper into said transfer chamber providing a submerged product transfer path of marked subatmospheric pressure in said chamber between said vertical legs, said input hopper being of substantially upwardly opening funnel-shaped configuration with said outlet opening at the bottom thereof, means for supplying the liquid to said hopper in a manner establishing a forced vortex therein for lowering the operating surface of the liquid near the vertical center axis of the hopper to a level sufficiently near the outlet opening to insure fluid current entrainment of the product into said conduit system for passage through said vertical legs and into said tank, means subdividing said tank into first and second zones, pump means for returning liquid at a selected rate directly from said first zone to said hopper including a vertically disposed pump housing conduit in said tank enclosing a pump in the lower portion thereof below said liquid level, said housing conduit having an inlet opening adjacent the bottom of the tank and a lateral outlet branch connecting the housing conduit above said liquid level to said hopper, a by-pass discharge conduit communicating said housing conduit with said tank located above said pump and below said liquid level for returning liquid elevated into said housing conduit by said pump to said tank, and valve means controlling said by-pass discharge conduit for regulating the proportion of liquid in said housing conduit discharged into the tank, and means for returning the liquid at a selected rate directly from the tank to said hopper.

6. Vacuum impregnation apparatus operable on a continuous basis for evacuating gases from the interior of food products and substituting a liquid in place of the evacuated gas, comprising a product input hopper having an outlet opening, a receiving tank at substantially the same level as said hopper, said hopper and tank adapted to contain said liquid to selected liquid levels therein, a tubular conduit system communicating with said hopper and said tank below said liquid levels for fluid current conveyance of the food products from said hopper to said tank, said conduit system including a vertical ascending conduit leg, a vertical descending conduit leg, a transfer chamber interconnecting the uppermost ends of said legs at a substantial height above the levels of said hopper and tank, and conduit means connecting lower end portions of said ascending and descending legs to said outlet opening and said tank, respectively, means for applying vacuum conditions to said transfer chamber to draw said liquid from said tank and hopper into said transfer chamber providing a submerged product transfer path of marked subatmospheric pressure in said chamber between said vertical legs, said conduit means connecting the lower end portion of said descending leg to said tank comprising a U-shaped conduit portion extending a substantial distance below the liquid levels of said tank and hopper to subject the food product to marked superatmospheric pressure, said U-shaped conduit portion having a first leg axially aligned with said vertical descending conduit leg as an extension thereof and a second leg having its axis in substantial lateral alignment with the axis of said vertical ascending conduit leg, means subdividing said tank into first and second zones, pump means for returning liquid at a selected rate directly from said first zone to said hopper, said conduit means communicating said descending leg only with said second zone to deliver the products to the latter, said means subdividing said tank including filtering means having a rotary liquid pervious filtering medium forming the sole liquid communication path between said first and second zones, means for rotating said filter medium for periodically raising portions of said filtering medium to a position above the liquid level in said tank, and fluid spray means for discharging a fluid spray through the raised portions of said filtering medium along a filtering medium cleaning path isolated from said liquid to clean contaminating matter from the filtering medium means for returning the liquid at a selected rate directly from the tank to said hopper.

7. Vacuum impregnation apparatus operable on a continuous basis for evacuating gases from the interior of food products and substituting a liquid in place of the evacuated gas, comprising a product input hopper having an outlet opening, a receiving tank, said hopper and tank adapted to contain said liquid to selected liquid levels therein, a tubular conduit system communicating with said hopper and said tank below said liquid levels for fluid current conveyance of the food products from said hopper to said tank, said conduit system including a vertical ascending conduit leg, a vertical descending conduit leg, a transfer chamber interconnecting the uppermost ends of said legs at a substantial height above the levels of said hopper and tank, conduit means connecting lower end portions of said ascending and descending legs to said outlet opening and said tank, respectively, means for applying vacuum conditions to said transfer chamber to draw said liquid from said tank and hopper into said transfer chamber providing a submerged product transfer path of marked sub-atmospheric pressure, in said chamber between said vertical legs, said ascending leg being interrupted at a vertical level above the tank intermediate the upper and lower ends thereof by at least one horizontal transition conduit portion for fluid current conveyance of the products along a path of selected length as substantially the same horizontal level for interrupting elevation of the products for a selected period, the major portion of said descending leg extending along a substantially rectilinear vertical axis and said horizontal transition conduit portion extends in a circular path encircling said descending leg substantially concentric with said descending leg, and means for returning the liquid at a selected rate directly from the tank to said hopper.

8. Vacuum impregnation apparatus as defined in claim 1 wherein said conduit system includes a plurality of successive sets of vertical conduit transitions each including a vertical ascending conduit transitions each including a vertical ascending conduit leg and a vertical descending conduit leg each interconnected at the uppermost ends of said legs by a transfer chamber at a substantial height above the levels of said hopper and tank, conduit means at substantially the level of said tank connecting lower end portions of said ascending and descending legs to each other coupling said sets of transitions in series relation between said outlet opening and said tank, and means for applying different vacuum conditions to each of said transfer chambers to draw said liquid from said tank and hopper into said transfer chambers providing a submerged product transfer path of different sub-atmospheric pressures in said chamber of said successive sets of conduits transitions.

9. Vacuum impregnation apparatus as defined in claim 8, wherein said sets of vertical conduit transitions are of progressively increasing height progressing from said hopper means to said tank and each succeeding transfer chamber in the series is subjected to lower pressure progressing from the outlet opening to said tank.

References Cited
UNITED STATES PATENTS

| | | | |
|---|---|---|---|
| 651,000 | 6/1900 | Webster | 55—193 |
| 2,012,969 | 3/1935 | Miller | 117—113 |
| 2,042,678 | 6/1936 | Miller | 118—50 |
| 2,241,737 | 5/1941 | Romberg | 209—3 |
| 2,293,840 | 8/1942 | Ligniau | 118—50 |
| 2,631,968 | 3/1953 | Peery | 209—172.5 X |
| 2,689,182 | 9/1954 | Richert | 99—100 |
| 2,722,920 | 11/1955 | Arrowsmith | 55—193 X |
| 2,966,230 | 12/1960 | Cervinka | 55—193 |
| 2,999,538 | 9/1961 | Hullmann | 118—50 X |
| 3,052,209 | 9/1962 | Werther et al. | 118—30 |

MORRIS KAPLAN, Primary Examiner

U.S. Cl. X.R.

99—100; 118—50, 603